Nov. 16, 1943.   E. A. McMURTRY   2,334,347
POWER MECHANISM FOR STEERING APPARATUS AND THE LIKE
Filed Aug. 21, 1941   2 Sheets-Sheet 1

Witness
Geo. N. Hurst

INVENTOR.
Edward A. McMurtry,
BY Parkinson & Lane
Attys.

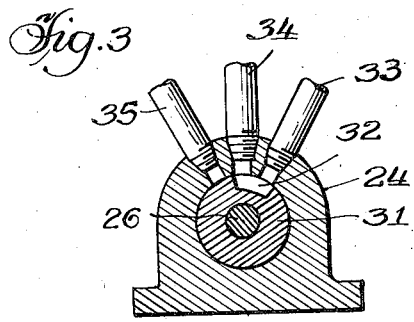
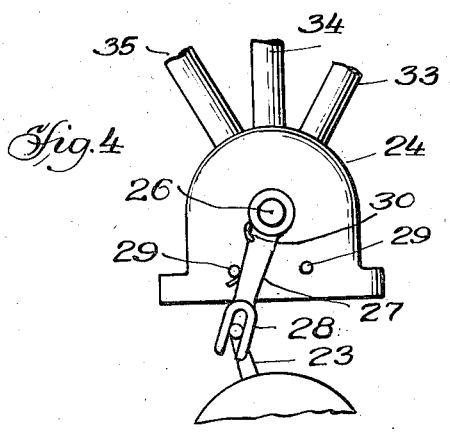
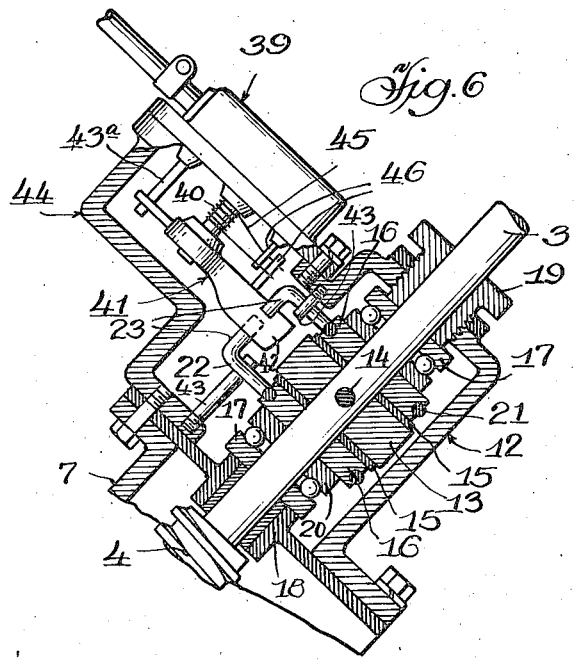
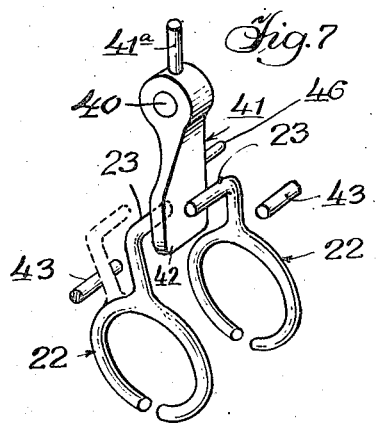
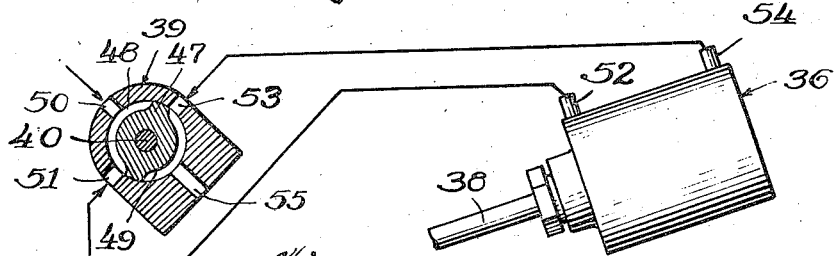

Patented Nov. 16, 1943

2,334,347

UNITED STATES PATENT OFFICE 2,334,347

POWER MECHANISM FOR STEERING APPARATUS AND THE LIKE

Edward A. McMurtry, Chicago, Ill.

Application August 21, 1941, Serial No. 407,699

5 Claims. (Cl. 180—79.2)

The present invention relates to a novel power drive unit initiated by manual operation such as the rotation of the steering wheel of a power propelled vehicle for assisting the operator in steering the vehicle and thereby greatly minimizing and relieving the operator of the strenuous manual effort required in steering and turning the wheels.

An important object of the present invention is the provision of a power unit so combined and associated with the manual initiating or steering mechanism as to operate automatically and practically instantaneously upon the operator initiating the manual turning of the wheel. It is a well known fact that substantial muscular effort is required in turning the wheels of an automotive vehicle including trucks, busses, road and farm machines, various forms of tanks, and the like, and in steering such vehicles. Applicant has therefore devised the novel power unit herein disclosed which merely requires the operator to begin the turning movement, after which the power unit functions to continue turning of the wheels, the amount of turning, however, being under the control of the operator for the reason that the power unit becomes inactive and disconnected when the operator ceases rotation of the steering wheel. This novel invention permits any such vehicle to be driven by a woman.

The present novel construction is in the form of an attachment which may be quickly and simply applied to substantially any form of standard steering mechanism, or which can be installed as initial or standard equipment on the vehicle. The novel construction is positive in action and is so designed and co-related with the normal steering mechanism that should, for any reason, the power unit fail, the steering mechanism may be controlled in the usual manner by manual operation. It is further positive in operation in that the power unit can operate only when the operator is manually turning the steering wheel, and is automatically disconnected when such manual turning ceases.

It is a still further object of the invention to provide a power unit so associated with the normal steering mechanism that the worm on the steering rod may be of a greater pitch than those employed with the usual hand operated device, thereby decreasing the amount or angle of turning required of the steering wheel. The power unit acts as a steering stabilizer dashpot and prevents all wheel shimmy and other erratic movements resulting from road-shock and the like.

Further objects are to provide a construction of maximum simplicity, efficiency, economy and ease of assembly, repair and operation, and such further objects, advantages and capabilities as will later more fully appear and are inherently possessed thereby.

The invention further resides in the construction, combination and arrangement of parts illustrated in the accompanying drawings, and while there is shown therein a preferred embodiment, it is to be understood that the same is susceptible of modification and change, and comprehends other details, arrangements of parts, features and constructions without departing from the spirit of the invention.

In the drawings:

Figure 3 is a view in vertical cross section through a novel valve construction employed in the power unit.

Figure 4 is a view in front elevation of the valve construction shown in Figure 3.

Figure 5 is a view in perspective of the dual valve arrangement.

Figure 6 is a fragmentary view, part in vertical cross section and part in side elevation, of an alternate construction of power unit and control mechanism therefor.

Figure 7 is an enlarged view in perspective of the novel control member for the power unit.

Figure 8 is a diagrammatic view of the valve and power cylinder assembly of Figure 6.

Figure 1:
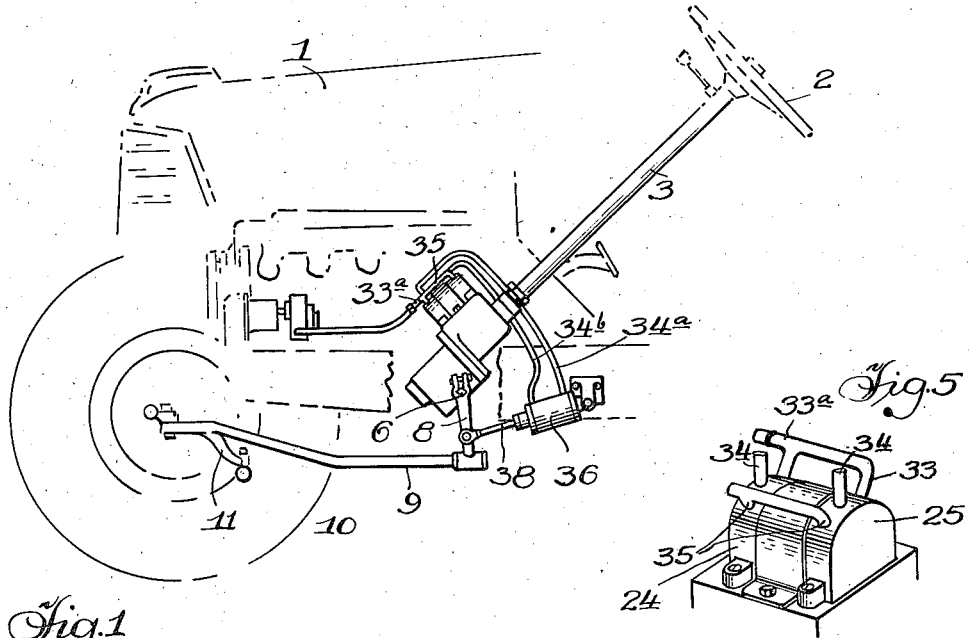
Figure 1 is a view in side elevation of the novel control mechanism associated with the steering mechanism of an automotive vehicle, the forward end of the vehicle being shown in phantom outline.

Referring more particularly to the disclosure in Figures 1 to 4 of the drawings, the novel power unit and control mechanism is illustrated as assembled with the steering mechanism of a power propelled vehicle 1. Such vehicle is shown as equipped with a steering wheel 2 mounted upon the upper end of a steering rod or shaft 3 which may be enclosed within the usual steering post. Mounted adjacent the lower end of this steering shaft is a worm 4 keyed, pinned, or otherwise secured to the rod and in continuous meshing engagement with a gear segment or toothed member 5 secured upon a stub shaft 6 shown as formed with a squared or polygonal end extending to the exterior of a housing section 7. Mounted upon the external end of this stub shaft is a lever arm 8 connected at its lower end to a steering rod 9 for steering and controlling the positioning of the front wheels 10 through a steering knuckle 11 in a manner well known in the art.

Secured upon the steering rod 3 within the housing section 12 is a sleeve or collar 13 shown as pinned at 14. Adjacent each side or face of this sleeve or collar is positioned a friction washer 15 and a collar 16 loose upon the steering shaft. Adjacent each collar 16 is also mounted a bearing retainer 17, the entire assembly of collar or sleeve 13, friction washers 15, collars 16 and bearing retainers 17 being adjustably mounted between a journal 18 and an adjustable nut 19, it being understood that at all times sufficient space is provided between the collar or sleeve 13 and the bearing retainers 17 whereby the thrust of the worm when turned in one direction will frictionally clutch one of the collars 16 between the collar or sleeve 13 and the inner bearing element 20, while the thrust of the worm in the other direction will frictionally clutch the other of said collars 16 between the collar or sleeve 13 and the inner element 20 of the other bearing retainer. It is, of course, understood that these collars 16 are normally free upon the steering rod 3 and one only rotates therewith when the thrust of the worm 4 is such as to cause clutching engagement of said collar.

In order that this clutching engagement may initiate and control the power unit, each collar 16 is provided with a peripheral groove or recess 21 for the reception of a split ring 22 having an upward and inwardly projecting portion 23. These split rings are preferably of a resilient material so constructed and arranged as to frictionally engage in the grooves 21 with sufficient tension that movement of either collar will cause it to carry along the split ring until an abutment is placed in the path of the ring.

Suitably mounted upon the housing section 12 are a pair of valve assemblies 24 and 25. Each is provided with a stub shaft 26 upon which is secured a depending arm 27. Each arm is bifurcated at its lower end 28 for the reception of the inwardly projecting portion 23 of the split ring 22 in such manner that should either of the collars 16 be clutched to rotate with the steering shaft upon the operator manually turning the steering wheel 2, rotation of the split ring 22 will carry with it the projecting end 23 and rotate the arm 27 in a manner more clearly shown in Figure 4 of the drawings. Provision is made for limiting the arc through which the arm 27 and consequently the split ring 22 rotate. For such purpose a pair of stops in the form of pins or other abutments 29 project from the valve housings 24 and 25 into the path of movement of the arm 27. A spring 30 tends to return this arm to its normal, inoperative position.

As more particularly shown in Figures 3 to 5 of the drawings, the valve units comprise a valve 31 secured upon the stub shaft 26. Each valve is provided with an arcuate slot 32 adapted to communicate between adjacent passages from the tubes or conduits 33, 34 and 35. Each tube or conduit 33 is connected to a common lead 33a, which in turn is connected to a source of fluid supply such as compressed air or other available fluid, including vacuum from the manifold, oil, etc., while each tube 34 supplies the fluid to the opposite ends of a common cylinder 36, and each tube or conduit 35 provides an exhaust passage leading to the atmosphere, exhaust manifold, muffler, etc. The tube 34 of the valve 24 is shown as connected to one end of the cylinder 36 as by means of a lead 34a, while the tube 34 of the valve 25 is shown as connected to the other end of the cylinder as by means of a lead 34b. In the positions shown in Figures 3 and 4 of the drawings, the valve is located in "on" position in which the fluid is supplied to the valve assembly.

Figure 2:
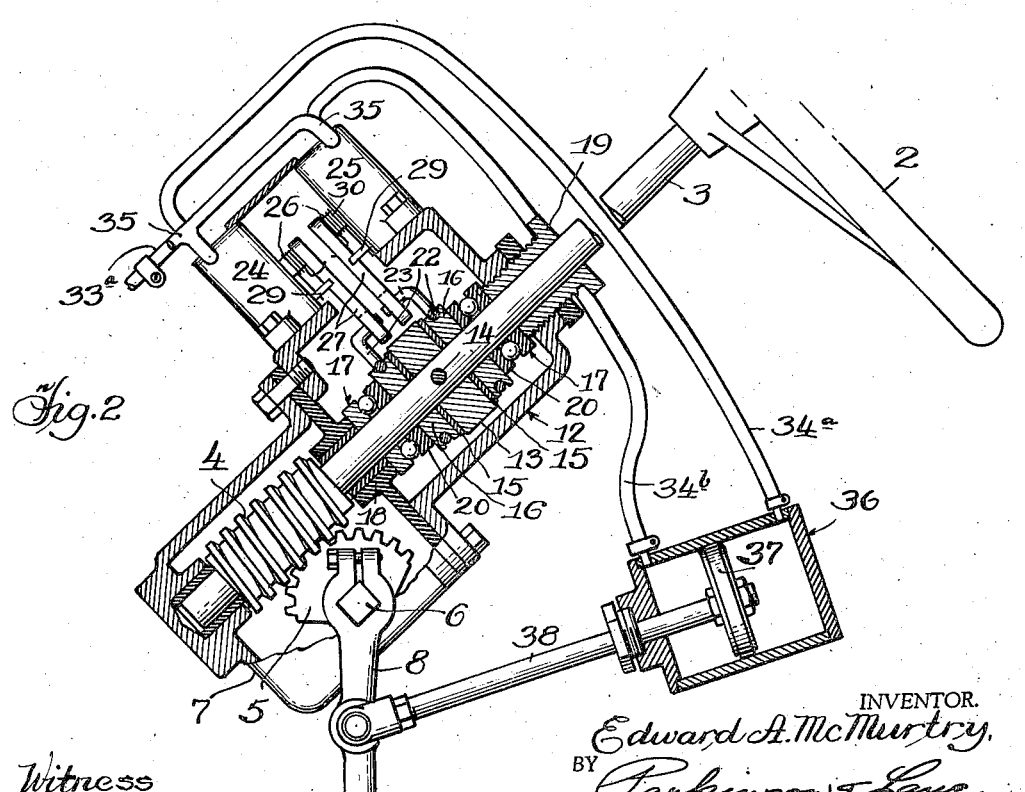
Figure 2 is a fragmentary enlarged view, part in vertical cross section and part in side elevation, of the control mechanism and power unit applied to the steering apparatus of an automotive vehicle.

When the collar 16 which is associated with the arm 27 connected to the valve 24 is rotated through an arc permitted by the stop pins 29, that is to the position as clearly shown in Figure 4, the arcuate slot 32 in the valve 24 would bridge the respective conduits 33 and 34 and fluid under pressure would flow from the conduit 33 and to and through the conduit 34 and passage 34a, into the cylinder 36 to the rear of the piston 37, thereby forcing this piston and its connecting arm 38 to the left as viewed in Figure 2 of the drawings, to thereby automatically apply power to boost and continue turning of the steering mechanism as desired and controlled by the operator. When the steering wheel is rotated in the opposite direction, valve 25 is similarly actuated and fluid is forced into the opposite end of the cylinder 36 through the lead 34b, the piston being moved in the direction opposite from that above referred to. However, prior to the opening of the valve 25, valve 24 is closed so that the fluid at the right hand of the cylinder 36 (see Figure 2) is exhausted back through the lead 34a and exhaust tube 35.

As stated above, this power control is initiated by the manual turning of the steering wheel 2 which applies a thrust upon the worm wheel 4 and its associated steering shaft or rod 3 to thereby frictionally grip one or the other of the collars 16 between the fixed collar or sleeve 13 and the inner face 20 of a bearing retainer 17. Immediately upon the operator manually stopping the rotation of the steering wheel 3, the respective collar 16 which was previously rotated with the collar or sleeve 13 is positively released from its clutching engagement, and the spring 30 will simultaneously move the arm 27 to its normal or off position. This movement of the arm 27 in turn rotates the valve 31 to the off position, thereby causing the arcuate slot 32 in the valve 31 to bridge the passage between the conduit 34 leading to an end of the cylinder 36, and the exhaust conduit 35 to thereby relieve the piston 37 of the fluid actuating pressure.

In Figures 6 to 8 is shown an alternate construction employing but a single valve in which the valve initiating mechanism is similar in construction and operation to that employed in Figures 1 to 5 inclusive, and like reference characters have been applied to such parts. In this latter form of the invention, a valve mechanism 39 as shown in Figures 6 and 8 is provided. This valve is actuated by a stub shaft 40 extending to the exterior of the valve housing, and upon this shaft is fixed or pinned an arm or lever 41. The depending end 42 of this arm extends downwardly between the inturned ends or projections 23 of the split rings 22. Thus, whichever split ring is rotated by its respective collar 16, the arm 41 will be moved in or rotated thereby an amount determined by the stops 43 projecting into the path of the projecting ends 23, and a stop 43a extending in the path of the projection 41a at the upper end of the arm or lever 41. These stops 43 are secured to and project from the inner walls of the housing section 44. In order that the arm 41 is returned to its normal, inoperative position when the operator stops manual turning of the steering wheel, a spring 45 is provided. This spring is shown as wrapped around the stub shaft 40 with the free ends engaging spaced inwardly projecting stops 46, one of which is carried by the arm or lever 41 and the other by the valve casing.

Figure 8 shows the valve construction with the valve 47 secured upon the stub shaft 40. This valve is provided with arcuate slots 48 and 49 so disposed that fluid entering at 50 may pass from this inlet port through the port 51 to the inlet port 52 of the cylinder 36, or pass through the port 53 to the inlet port 54 at the other end of the cylinder. In this form of valve as in the dual valve arrangement, means is provided for positively moving the piston through fluid pressure in both directions so that the wheels may be turned in either direction. An exhaust port 55 leads to the atmosphere or wherever desired so as to prevent locking of the steering mechanism in any position of movement.

I claim:

1. Power mechanism for augmenting the manual turning movement in either direction of manually controlled steering apparatus and the like and in which said apparatus is provided with a steering shaft, a worm fixed thereon and subjected to a thrust when manually rotated in either direction, a tooth member in mesh with said worm and a connection from said member for turning the wheels of a vehicle, comprising a pair of collars loose upon said shaft but adapted to be clutched thereto upon the application of thrust to said worm, a valve connected to each collar and responsive to thrust in but one direction, and a power unit associated with and controlled by said valves and connected to the steering apparatus for relieving the operator of the manual effort and physical fatigue encountered in steering a power propelled vehicle.

2. A reversible power mechanism for assisting the turning movement of manually controlled steering apparatus and the like, and in which said apparatus is provided with a steering shaft and a worm fixed thereon and subjected to a thrust when manually rotated in either direction, comprising a pair of collars loose upon the shaft, thrust bearings adjacent said collars, one of said collars being adapted to be moved into contacting engagement with its adjacent thrust bearing and rotate with the worm when the latter is subjected to end thrust, a valve connected with each collar, means for limiting the rotation of said collars and valves, and power means actuated by said valves for assisting the manual turning effort by the operator when turning the steering apparatus in either direction.

3. A reversible power mechanism for assisting the turning movement of manually controlled apparatus including manually rotatable shaft and a worm secured thereon and subjected to an end thrust each time that the operator rotates the shaft, comprising a pair of members normally loose upon the shaft but adapted to be clutched for rotation therewith each time the worm is subjected to an end thrust, an independently operable split ring associated with each collar and rotatable therewith, and a power unit connected to the manually controlled apparatus and including valve mechanism actuated by turning movement of each split ring whereby to apply power to assist the turning movement in either direction, means for limiting the turning movement of the split rings, and means for automatically and positively disconnecting the power unit upon the operator ceasing turning effort in either direction.

4. A reversible power mechanism for assisting the turning movement of manually controlled steering apparatus and the like and in which the apparatus is provided with a steering shaft and a worm fixed thereon and subjected to a thrust when manually rotated in either direction, comprising power means for assisting the manual turning effort by the operator when turning the steering apparatus in either direction, a pair of control members loose upon the shaft but either adapted to be clutched thereto, a power control valve actuated by one of the control members for causing the power unit to operate in one direction and an independent power control valve actuated by the other control member for causing the power unit to operate in the opposite direction.

5. Power mechanism for augmenting the manual turning movement in either direction of manually controlled steering apparatus and the like and in which the apparatus is provided with a steering shaft, a worm fixed thereon and subjected to a thrust when manually rotated in either direction, a tooth member in mesh with the worm and a connection from the member for turning the wheels of a vehicle, comprising a pair of control members loose upon the shaft but either adapted to be clutched thereto upon the application of thrust to the worm, a double-acting control valve actuated in one direction by one of the control members and independently actuated in the opposite direction by the other control member, and a power unit actuated by the control valve for assisting the manual turning effort by the operator when turning the steering apparatus in either direction.

EDWARD A. McMURTRY.